(12) United States Patent
Priezzhev et al.

(10) Patent No.: US 8,700,372 B2
(45) Date of Patent: Apr. 15, 2014

(54) METHOD FOR 3-D GRAVITY FORWARD MODELING AND INVERSION IN THE WAVENUMBER DOMAIN

(75) Inventors: Ivan Priezzhev, Moscow (RU); Harold Pfutzner, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 355 days.

(21) Appl. No.: 13/044,996

(22) Filed: Mar. 10, 2011

(65) Prior Publication Data

US 2012/0232871 A1    Sep. 13, 2012

(51) Int. Cl.
  *G06G 7/48*    (2006.01)
(52) U.S. Cl.
  USPC ............................................. 703/10
(58) Field of Classification Search
  USPC ............... 703/6, 10; 702/11, 14; 367/38, 73; 166/302; 250/256
  See application file for complete search history.

(56) References Cited

U.S. PATENT DOCUMENTS

| | | | |
|---|---|---|---|
| 5,173,879 A | | 12/1992 | Cung et al. |
| 5,675,147 A | * | 10/1997 | Ekstrom et al. ............... 250/256 |
| 5,970,787 A | | 10/1999 | Wignall |
| 6,502,037 B1 | * | 12/2002 | Jorgensen et al. ............. 702/14 |
| 2002/0120429 A1 | | 8/2002 | Ortoleva |
| 2003/0060981 A1 | | 3/2003 | Routh et al. |
| 2004/0172199 A1 | * | 9/2004 | Chavarria et al. ............... 702/14 |
| 2005/0149267 A1 | * | 7/2005 | Van Den Beukel et al. ..... 702/14 |
| 2009/0089028 A1 | * | 4/2009 | Sagert et al. ..................... 703/6 |
| 2009/0157321 A1 | * | 6/2009 | Denichou et al. ............... 702/11 |
| 2009/0238040 A1 | * | 9/2009 | Duncan et al. .................. 367/38 |
| 2010/0126727 A1 | * | 5/2010 | Vinegar et al. ................ 166/302 |
| 2011/0255371 A1 | * | 10/2011 | Jing et al. ......................... 367/73 |

OTHER PUBLICATIONS

Thomas et al., "Real-time near-field acoustic holography for continuously visualizing nonstationary acoustic fields", J. Acoust. Soc. Am., Dec. 2010.*
Sean Fu, "Methods of reconstructing acoustic quantities based on acoustic pressure measurements", J. Acoust. Soc. Am., Dec. 2008.*
Mizutani, H., "Generalization of smoothness measure for standard regularization and its application to surface reconstruction", Electronics and communication, Japan 1994.*
Yakubov et al., "New fast SAR method for 3-D subsurface radiotomography", 10th Intl. conference on Ground penetrating radar, Jun. 2004.*
International Search Report and Written Opinion of PCT Application No. PCT/US2012/028555 dated Oct. 30, 2012: pp. 1-10.

(Continued)

*Primary Examiner* — Kandasamy Thangavelu
(74) *Attorney, Agent, or Firm* — John Vereb

(57) ABSTRACT

A method for determining spatial distribution of a property within a volume of subsurface formations includes generating an initial model of spatial distribution of a property of the formations using available data related to the property distribution within the volume. A forward model is generated in the wavenumber domain of spatial distribution of a potential field. Measurements of a physical parameter having a potential field obtained at spaced apart locations above the volume and/or in at least one wellbore penetrating the volume are entered. A revised model of spatial distribution of the potential field is generated by interpolating the measurements of the parameter. The interpolating is performed in the wavenumber domain. A revised model of spatial distribution of the physical property is generated by inversion in the wavenumber domain of the revised potential field model.

35 Claims, 10 Drawing Sheets

(56) References Cited

OTHER PUBLICATIONS

Archie, "The Electrical Resistivity Log as an Aid in Determining Some Reservoir Characteristics," Petroleum Technology, Jan. 1942: 54-62.

Wiener, "Introduction," and "Chapter II: The Linear Predictor for a Single Time Series," Extrapolation, Interpolation, and Smoothing of Stationary Time Series with Engineering Applications, MIT Press: Massachusetts, 1949: pp. 1-24 and 56-80.

Birch, "Composition of the Earth's Mantle," Geophysical Journal of the Royal Astronomical Society, Dec. 1961, vol. 4: pp. 295-311.

Parker, "The Rapid Calculation of Potential Anomalies," Geophys. J. R. astr. Soc., 1972, vol. 31: pp. 447-455.

Gardner et al., "Formation Velocity and Density—the Diagnostic Basics for Stratigraphic Traps," Geophysics, Dec. 1974, vol. 39(6): pp. 770-780.

Tikhonov et al.,"Chapter IV: Approximate Solutions of Integral Equations of the First Kind of the convolution Type," and "Chapter V: Certain Optimal Regularizing Operators for Integral Equations of the Convolution Type," Solutions of Ill-Posed Problems, V. H. Winston & Sons: Washington, D.C., 1977: pp. 109-145 and 147-173.

Khalevin et al., "Joint Application of P- and S-Waves in Deep Seismic Sounding," Soviet Geology and Geophysics, 1986, vol. 27(10): pp. 85-89.

Lines et al., "Cooperative inversion of geophysical data," Geophysics, Jan. 1988, vol. 53(1): pp. 8-20.

Haber et al., "Joint inversion: a structural approach," Inverse Problems, 1997, vol. 13: pp. 63-77.

Meju et al., "Evidence for correlation of electrical resistivity and seismic velocity in heterogeneous near-surface materials," Geophysical Research Letters, 2003, vol. 30(7): pp. 26-1—26-4.

Gallardo-Delgado et al., "A versatile algorithm for joint 3D inversion of gravity and magnetic data," Geophysics, May-Jun. 2003, vol. 68(3): pp. 949-959.

Gallardo et al., "Characterization of heterogeneous near-surface materials by joint 2D inversion of dc resistivity and seismic data," Geophysical Research Letters, 2003, vol. 30(13): pp. 1-1—1-4.

Gallardo et al., "B03311: Joint two-dimensional DC resistivity and seismic travel time inversion with cross-gradients constraints," Journal of Geophysical Research, 2004, vol. 109: 1-11.

Candansayar et al., "Two-Dimensional Joint Inversion of Radiomagnetotelluric and Direct Current Resistivity Data," 18th IAGA WG 1.2 Workshop on Electromagnetic Induction in the Earth, Sep. 2006: pp. 1-6.

Tryggvason et al., "L07303: Local earthquake (LE) tomography with joint inversion for P- and S-wave velocities using structural constraints," Geophysical Research Letters, 2006, vol. 33: pp. 1-5.

Dell'Aversana, "Joint Inversion of Seismic, Gravity and Magnetotelluric Data Combined with Depth Seismic Imaging," EGM International Workshop, 2007: pp. 1-4.

Gallardo et al., "Joint two-dimensional cross-gradient imaging of magnetotelluric and seismic traveltime data for structural and lithological classification," Geophys. J. Int., 2007, vol. 169: pp. 1261-1272.

Colombo et al., "Geophysical modeling via simultaneous joint inversion of seismic, gravity, and electromagnetic data: Application to prestack depth imaging," The Leading Edge, Mar. 2007: pp. 326-331.

Colombo et al., "Simultaneous Joint Inversion of Seismic and Gravity Data for Long Offset Pre-Stack Depth Migration in Northern Oman," CSPG CSEG Let it Flow Convention, 2007: pp. 191-195.

Hu et al., "Joint Inversion Algorithm for Electromagnetic and Seismic Data," SEG/San Antonio Annual Meeting, 2007: pp. 1745-1749.

\* cited by examiner

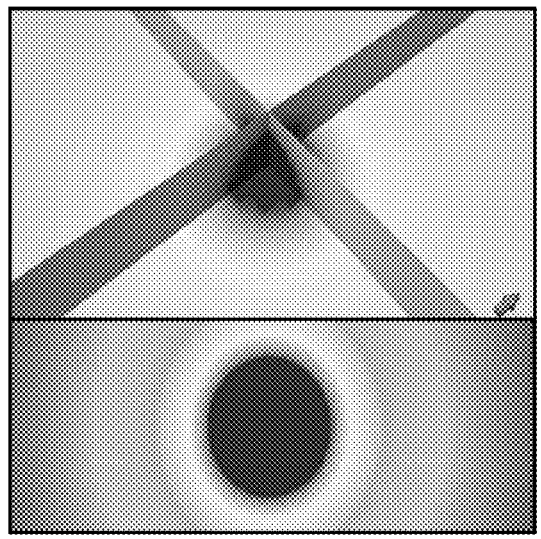
*Fig. 4*
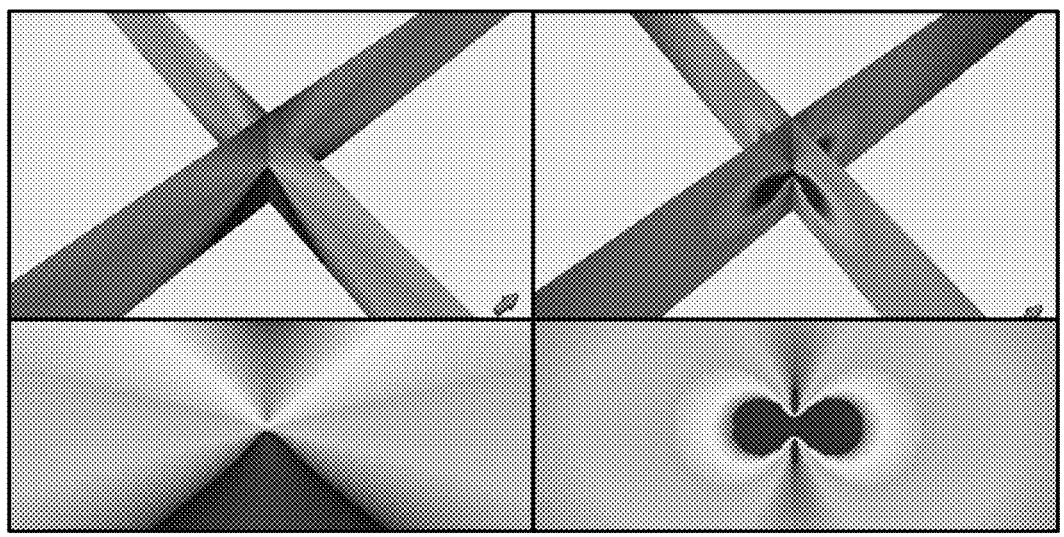
*Fig. 5A*          *Fig. 5B*

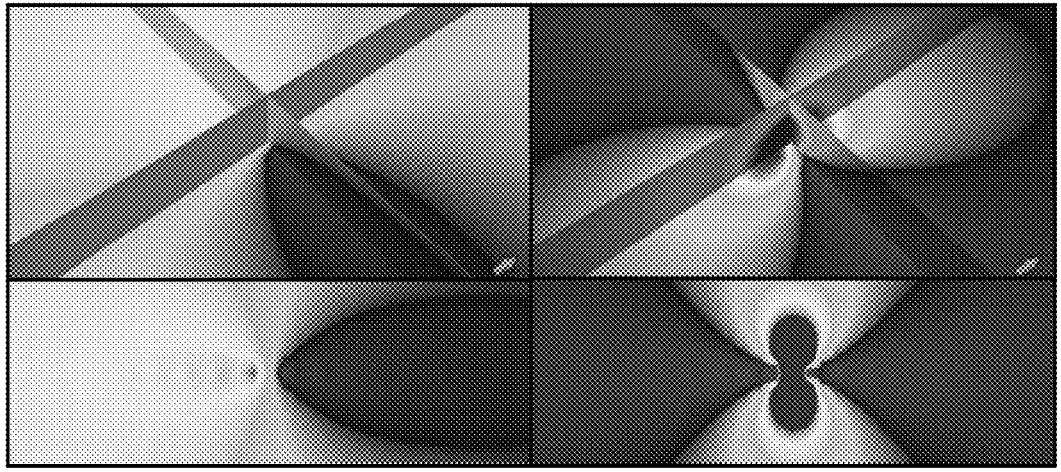
*Fig. 6A*  *Fig. 6B*
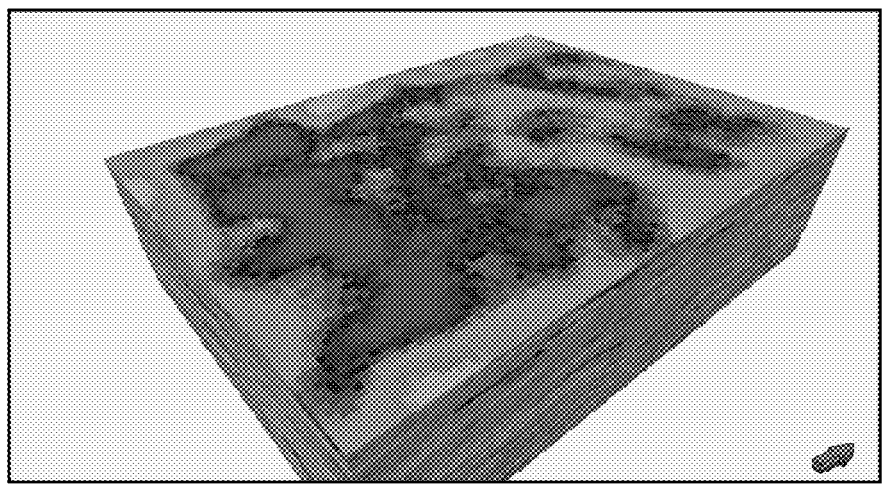
*Fig. 7*

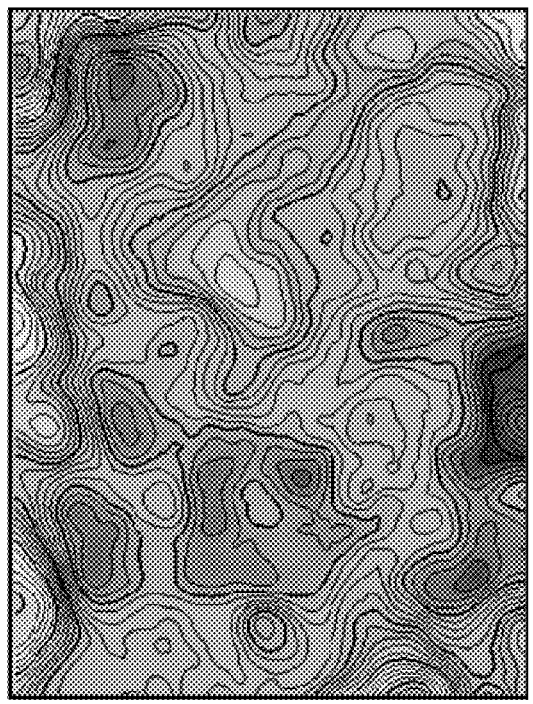
*Fig. 10*
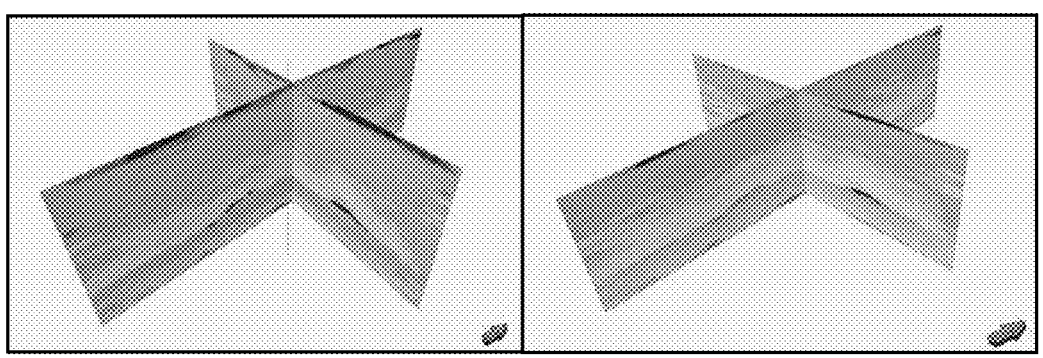
*Fig. 11A*  *Fig. 11B*

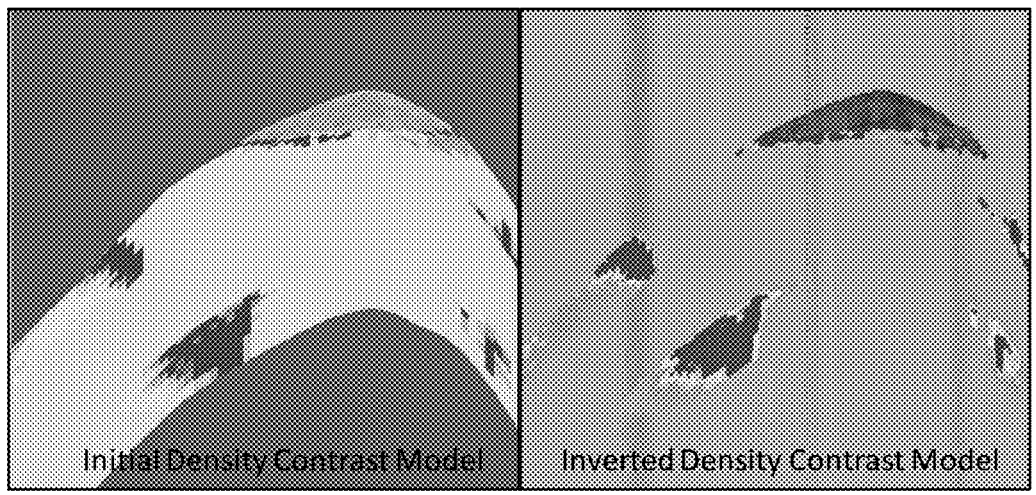
*Fig. 14A*  *Fig. 14B*
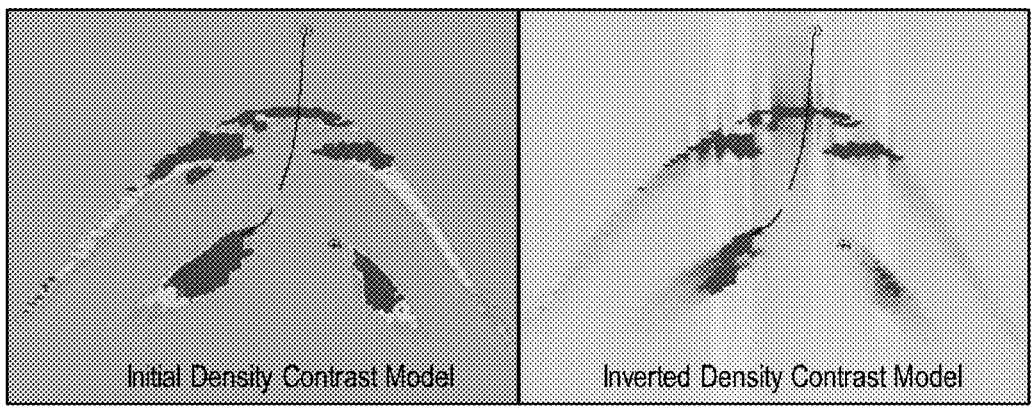
*Fig. 14C*  *Fig. 14D*

METHOD FOR 3-D GRAVITY FORWARD MODELING AND INVERSION IN THE WAVENUMBER DOMAIN

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of measurements of Earth's gravity.

More particularly, the invention relates to gravity survey and interpretation techniques used to generate a three-dimensional image of gravitational acceleration and density.

2. Background Art

Certain types of geophysical measurements are used to identify the boundaries of a subsurface volume having a property of interest whose value is different from its surroundings. Such subsurface volumes may be associated with the presence of economically useful materials such as hydrocarbons. Reflection seismic surveying has been widely used for such purposes, but as requirements for resolution of spatial distribution of the selected property and depth in the subsurface of such volumes have increased, and the range of subsurface conditions has expanded to include formations such as salt and basalt, voids, fluid movement and other factors that affect the seismic response, it has become important to augment reflection seismic data with other geophysical data such as gravity.

One technique used for interpretation of geophysical data is known as inversion. In the most general sense, inversion includes generating a "model" or an initial estimate of spatial distribution of one or more properties of interest in a subsurface volume of interest. An expected response of a geophysical measuring system, such as a seismic survey system, is generated from the model. Such estimation may be referred to as forward modeling. The forward modeled system response is compared to measurements. Parameters of the initial model may be adjusted, the forward model generation may be repeated, and comparison of the repeated forward model to the measurements may be repeated until differences between the forward model and the measurements fall below a selected threshold or reach a minimum.

In the interpretation of multiple forms of geophysical measurement data, it would be advantageous to have inversion procedures that have similar formulations of the inverse problem regardless of the type of geophysical data to be inverted. This allows models to be coupled, as long as the data have comparable spatial support. One of the simplest methods uses the geophysical data sequentially during the inversion process, that is, one type of geophysical data is inverted first, followed sequentially by a similar or the same inversion procedure applied to one or more different types of geophysical survey data. The foregoing approach treats the sets of geophysical data separately. For instance, for inversion of the seismic and the gravity data, the cooperative (or sequential) algorithm uses the seismic model computed by the previous iteration to constrain the gravity model at the current iteration. This process will be repeated until convergence of the inversion procedures takes place and the final models are consistent with each other.

Another method is based on the simultaneous minimization of a misfit, error or "objective" function that includes the data of each geophysical data type. The principle feature of such technique consists in introducing an equation connecting various physical parameters of the petrophysical media, such as density, seismic velocity and resistivity. The foregoing method has received considerable attention among geophysical data users. Multiple geophysical data that are sensitive to different physical quantities may be simultaneously inverted by minimizing an objective function that includes the data misfit of different data types where the solution is constrained around a petrophysical relationship. However, petrophysical links between geophysical properties, at a specific site, are in many cases unknown as they are affected by a multitude of rock properties so determination of this relationship represents the most difficult task for this method. Other types of relationships have been introduced to avoid the parameterization of the petrophysical relationships.

While gravity brings independent information to the geophysical inversion problem, gravity data are typically sparse. Further, because gravity measurements are the measurement of a potential field, inversion of gravity data frequently results in non-unique solutions. There exists a need for an inversion technique for three-dimensional gravity survey data that makes optimum use of combinations of gravity and seismic data, and surface and borehole gravity data, in order to overcome the sparseness of data and non-uniqueness of inversion solutions.

SUMMARY OF THE INVENTION

A method according to one aspect of the invention for determining spatial distribution of a property within a volume of subsurface formations includes generating an initial model of spatial distribution of a property of the formations using available data related to the property distribution within the volume. A forward model is generated in the wavenumber domain of spatial distribution of a potential field. Measurements of a physical parameter having a potential field obtained at spaced apart locations above the volume and/or in at least one wellbore penetrating the volume are entered. A revised model of spatial distribution of the potential field is generated by interpolating the measurements of the parameter. The interpolating is performed in the wavenumber domain. A revised model of spatial distribution of the physical property is generated by inversion in the wavenumber domain of the revised potential field model.

Other aspects and advantages of the invention will be apparent from the following description and the appended claims.

BRIEF DESCRIPTION OF THE DRAWINGS

FIG. 4 shows a 3-D distribution of the gravity potential, g, due to a point source viewed as a 3-D window (top) and in cross-section (bottom).

FIGS. 5A and 5B show, respectively, the 3-D distributions of the first vertical derivative, $g_z$, and the second vertical derivative, $g_{zz}$, of the gravity potential, g, due to a point source viewed as 3-D windows (top) and in cross-section (bottom).

FIGS. 6A and 6B show, respectively, the 3-D distributions of the first horizontal derivative, $g_x$, and the second horizontal derivative, $g_{xx}$, of the gravity potential, g, due to a point source viewed as 3-D windows (top) and in cross-section (bottom).

FIG. 7 shows an example of an initial model of density in a regular grid that is generated using PETREL software.

FIG. 10 shows a plan view of the surface at z=0 for the forward modeled $g_z$ shown in FIG. 9.

FIGS. 11A and 11B show, respectively, the initial density distribution and the density distribution that results from the inversion of the 3-D gravity field shown in FIG. 9.

FIGS. 14A and 14B show the result of inverting the 3-D gravity model in order to recover the initial density contrast model. Agreement between initial and inverted models is good.

FIGS. 14C and 14D show a similar comparison as FIGS. 14A and 14B, through a different cross-section of the reservoir and with a wellbore trajectory superimposed.

DETAILED DESCRIPTION

Figure 1:
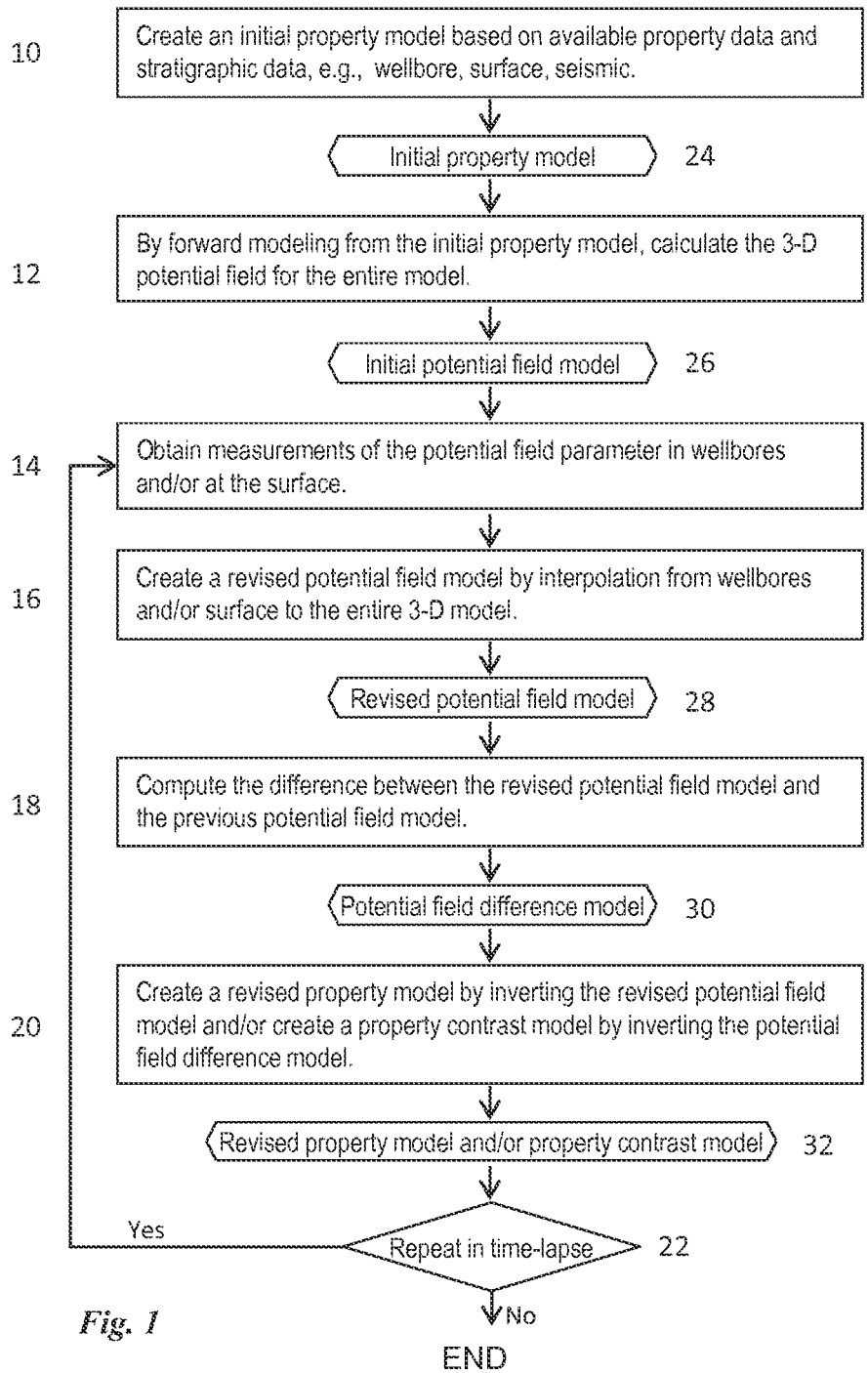
FIG. 1 shows a flowchart of an example method according to the invention.

The description of the present invention will begin with an explanation of various forms of joint inversion of different types of geophysical data. The explanation will be followed with a description of an example implementation of inversion of gravity measurements in three dimensions.

Links are generally necessary to constrain the solution during a joint inversion procedure. Among the links that can be used in a gravity inversion procedure according to the present invention are petrophysical links and structural links.

Petrophysical (Empirical) Links

This portion of the description begins with an explanation of the petrophysical relationships that maybe used with seismic and gravity data sets. A principal condition for the joint inversion of seismic and gravity data is an established dependence between seismic velocity and formation (rock) density. This dependence, which is a consequence of elasticity theory, states that the velocity of seismic body wave propagation in an elastic medium depends on the elasticity tensor and the density of the medium. For performing joint interpretation of seismic and gravity data sets, the correlation between rock density and seismic velocity may be established, for example, using the results of laboratory measurements and approximated by a linear regression curve on a density-velocity diagram. The correlation between these geophysical parameters was analyzed by Birch (F. Birch, 1961, *Composition of the Earth's mantle*, Geophys. J. Roy. Astr. Soc., 4, 295-311.) and presented in its most common form as a linear equation relating compressional wave velocity $V_p$ to rock density $\rho$:

$$V_p = a + b\rho \qquad 1$$

where a and b are empirical constants depending on the pressure, temperature, rock composition, etc.

Subsequent to the Birch publication, other researchers have investigated the density-velocity relationship under laboratory conditions and have calculated linear and more sophisticated nonlinear relationships between compressional wave velocity and rock density. Numerous relationships between density and $V_p$ have been compiled from measurements made under laboratory conditions and in boreholes for various types of rocks from different geological provinces and at different pressures and temperatures.

A nonlinear relationship connecting density with both compressional wave and shear wave velocities was determined by Khalevin et al. (N. I. Khalevin, Aleinikov, A. L., Kolupajeva, E. N., Tiunova, A. M., Yunusov, F. F., 1986, *On Joint Use of Longitudinal and Transverse Waves in Deep Seismic Sounding*, Geologia Geofiz., Novosibirsk, 10, 94-98.):

$$\rho = 2.66 - 0.107V_p - 0.0535V_s + 0.026V_pV_s + 0.0463(V_p^2 - 1.3333V_s^2) \qquad 2$$

One of the most widely used correlation curves used in the joint interpretation of seismic and gravity data was established by Gardner et al. (G. H. F. Gardner, Gardner, L. W. and Gregory, A. R., 1974, *Formation velocity and density—diagnostic basics for stratigraphic traps*, Geophysics, Vol. 39.). The investigators conducted a series of studies to determine an empirical relationship between the rock density and compressional wave velocity, $$\rho = aV_p^{1/4} \qquad 3$$

where a is a constant.

To apply the foregoing relationship, it may be supposed that the area under study is divided into blocks in which density is assumed to be constant, and the density in each block is calculated from the velocity in accordance with an a priori determined density-velocity relationship.

The foregoing principle is applicable to other forms of joint inversion. If one is interested, for example, in joint inversion of electromagnetic and seismic data sets, a first step would be to establish common factors that affect both seismic and electrical rock properties, and then to determine a set of circumstances in which joint inversion of both seismic and electromagnetic measurements can be useful. Some results of geophysical experiments demonstrate that there exists a correlation between high electrical conductivity and low velocity zones in porous rocks. For example, the link between the resistivity R (the inverse of conductivity) and the compressional seismic velocity $V_p$ can be established by an empirically determined log-linear equation:

$$\log(R) = a + bV_p \qquad 4$$

where a and b are parameters obtained from linear regression of resistivity and seismic velocity data, for example, from well log data.

For joint inversion of gravity and electromagnetic data sets, other relationships should be established to couple the density and the resistivity parameters. The connection between these two parameters can be established using Archie's law (G. E. Archie, 1942, *The electrical resistivity log as an aid in determining some reservoir characteristics*, PET Trans., AIME 132:149-171.):

$$S_w = \left(a\frac{R_w}{\phi^m R_t}\right)^{1/n} \qquad 5$$

where a, n and m are constants (i.e., the tortuosity factor, saturation exponent and porosity exponent, respectively), $R_w$ and $R_t$ are the water and the bulk formation resistivity, respectively. On the other hand, the bulk density $\rho_t$ can be expressed in porous media as a fractional volume of pore space (porosity) $\phi$ and the fractional volume of the total pore space volume that is occupied by water (water saturation) $S_w$ as:

$$\rho_t = (1-\phi)\rho_m + S_w\phi\rho_w \qquad 6$$

where $\rho_m$ is the rock matrix density and $\rho_w$ is the pore water density.

Combining equations (5) and (6), the bulk density may be expressed by:

$$\rho_t = \rho_m(1-\phi) + [aR_w/(R_t\phi^{m-1})]^{1/n}\rho_w \qquad 7$$

The efficiency of equation (7) depends on the accuracy with which the Archie parameters a, m and n have been determined. The Archie parameters have been subject to many laboratory investigations. There are many factors affecting the porosity exponent, m, the saturation exponent, n and the tortuosity factor, a. Therefore, it is often very difficult to establish the Archie parameters regardless of the reservoir characteristics: rock wettability, formation water salinity, permeability, porosity and fluids distribution. According to equation (7), it is possible to have several different combinations of porosity, bulk and water resistivities, and matrix and water densities that accurately fit both gravity and electromagnetic survey data.

In spite of the existence and widespread use of some empirical relationships to couple some petrophysical parameters, joint inversion is not yet a standard tool in geophysical applications, because robust and well-established petrophysical models are usually only available for certain geophysical parameters. In addition, the petrophysical relationships can often only be applied in restricted geological settings. To avoid introducing questionable petrophysical relationships, several investigators tried to establish a relationship based on the geometry of the area under study to constrain results of the joint inversion process. The foregoing idea assumes that the subsurface can be divided into discrete, smaller volumes (called "blocks" or "cells") having uniform physical properties and having geometries that are common for all physical properties evaluated in the inversion.

Structural (Geometrical) Links

Structural links have been established in joint inversion to assumed interfaces (i.e., geological boundaries) at the same locations, but with different and unlinked model parameters within each block of the model when a petrophysical relationship is unknown or not well established. The foregoing approach has been introduced by several authors (see, e.g., E. Haber and Oldenburg, D., 1997, *Joint inversion: a structural approach, Inverse Problems*, Vol. 13; L. A. Gallardo and Meju, M. A., 2004, *Joint two-dimensional dc resistivity and seismic travel time inversion with cross-gradients constraints*, Journal of Geophysical Research, Vol. 109; L. A. Gallardo and Meju, M. A., 2003, *Characterization of heterogeneous near-surface materials by joint 2-D inversion of dc resistivity and seismic data*, Geophysical Research Letters, Vol. 30.) for exploration and geophysical mapping applications. The idea behind the structural linking approach is that geophysical properties in the area under study are dependent on the same underlying geology.

Haber and Oldenburg (1997) introduced a joint inversion method to find models that are structurally similar, in the sense that spatial changes in models occur at the same locations. The foregoing type of joint inversion is generally applicable to over-parameterized two- and three-dimensional models and it is essentially based on minimizing the squared difference of a weighted Laplacian of the two models $m^A$ and $m^B$. This constraint is expressed by:

$$\phi_{CL} = \sum_{i=1}^{N} (S[m_i^A] - S[m_i^B])^2 \qquad 8$$

where the operator S(m) is described by:

$$S(m) = \begin{cases} 0 & |\nabla^2 m| \le \tau \\ 1 & |\nabla^2 m| > \tau \end{cases} \qquad 9$$

where $\tau$ is the threshold constant and $\nabla^2 m$ is the Laplacian of the model m.

Gallardo and Meju (2003) established an improvement to the structural approach for joint inversion proposed by Haber and Oldenburg (1997) by defining the cross-gradients function t(x, y, z) as:

$$t(x,y,z) = \nabla m^A(x,y,z) \times \nabla m^B(x,y,z) \qquad 10$$

where $\nabla m^A$(x, y, z) and $\nabla m^B$(x, y, z) are the gradients of models $m^A$ and $m^B$ at locations x, y and z, and × indicates the cross-product. By setting the condition that the discretized cross-gradients function is close to zero at each location during the inversion process, either the gradients of the two resulting models will be parallel or anti-parallel to each other, or one or both of the models does not change during inversion. The boundaries within the resulting model will have the same orientation.

An advantage of the Meju and Gallardo approach (2003, 2004) compared to the Haber and Oldenburg approach (1997) is that constraints based on the cross-gradients function do not focus on the magnitudes of the changes, which are difficult to estimate a priori and may necessitate a number of tuning parameters. The cross-gradients function forces the cross product of the physical property gradients to be zero, so no tuning parameters are needed to determine the magnitude of the constraint. The zero value of its magnitude defines the co-linearity of two physical properties. Gallardo and Meju (2003) used the cross-gradients function to constrain the joint inversion of different types of data (for example, DC resistivity and refraction seismic data, magnetic and gravity data sets).

The approach of Gallardo and Meju (2003, 2004) does not consider relationships of any sort among petrophysical parameters but instead constrains the models to look similar to each other by imposing the same gradients in each model. The foregoing approach overcomes some difficulties related to inaccurate parameter relationships but, on the other hand, imposes rigid model similarity that might not always be valid for different types of geophysical data.

Joint Inversion Strategy

The inverse problem of geophysical data corresponds to an ill-posed problem in the Hadamard sense (J. Hadamard, 1902, *Sur les problèmes aux dérivées partielles et leur signification physique, Princeton University Bulletin*, 49-52.) due to the non-existence, non-uniqueness and/or unstable solution of the problem. As is well known in the art, geophysical data alone are typically not sufficient to solve this problem, thus further information is required and a unique and reasonable solution is found only by regularizing the inverse problem. The regularization of the inverse problem is typically achieved by assuming that model parameters are strongly correlated in parameter space or the converged model is close to a known a priori model. The regularization can be achieved, for example, by imposing smoothness constraints, damping constraints and/or a priori information, in addition to the empirical and geometrical constraints required by the joint inversion.

The different functions necessary to solve the joint inverse problem are combined into a global objective function expressed by:

$$\phi(m) = \phi_d(m) + \phi_m(m) + \phi_L(m) \qquad 11$$

where m represents the models to be identified. In the following expression, $$\phi_d(m) = \sum_{i=1} (d_i - f_i(m_k))^T C_d^{-1} (d_i - f_i(m_k)) \qquad 12$$

is the sum of the difference between the observed values of the $i^{th}$ data and the computed data computed from the $k^{th}$ model through a nonlinear function $f$, as frequently the geophysical problems are nonlinear. It may be supposed the data are contaminated by noise and the errors are assumed to be uncorrelated and represented by a diagonal covariance matrix $C_d$.

Similarly, $$\phi_m = (m - m_{ref}) C_m^{-1} (m - m_{ref}) \qquad 13$$

represents the model objective function which is the sum of the closeness of the model to an a priori model $m_{ref}$, normalized by the covariance matrix of the a priori model $C_m$. This function can be considered as a regularization term for the separate data inversion.

The function $\phi_L$ corresponds to the link between the parameters to be identified. The link may be based on a structural (geometrical) constraint and/or an empirical relationship connecting the geophysical properties, as introduced previously herein. To include the structural constraints, almost all joint inversion procedures use the cross-gradient criterion specified in equation (10). To implement this constraint, one can discretize the cross-gradients function with the forward difference scheme, then one can estimate this function for a candidate model by using a first-order Taylor expansion around the cross-gradients function at the previous iteration.

Several algorithms have been used to minimize iteratively the above global objective function in equation (11) where the inverse problem is linearized around the model of the previous iteration. The associated partial derivative of the data with respect to the model parameters (i.e., the Jacobian or sensitivity matrix) should be computed and is used to find an updated model with improved data fit. During the minimization process, the geophysical models will be updated until the models are consistent with each set of geophysical data, will respect the single inversion regularization term and respect the constraint linking the models.

The efficiency of the iterative minimization algorithm depends on the manner in which the gradient of the objective function is computed. The gradient of the objective function may often pose a problem to be calculated due to the nonlinear behavior of the geophysical model and the nonlinear regularization and constraints introduced in the global objective function. The present explanation focuses on iterative algorithms, otherwise, there are other techniques to solve the joint inversion problem such as stochastic algorithms.

The foregoing links and joint inversion procedures may be used with a gravity inversion procedure including a forward modeling technique according to the invention. The gravity inversion procedure described below may also be used by itself.

Forward Modeling and Inversion in the Wavenumber Domain

Figure 3A:
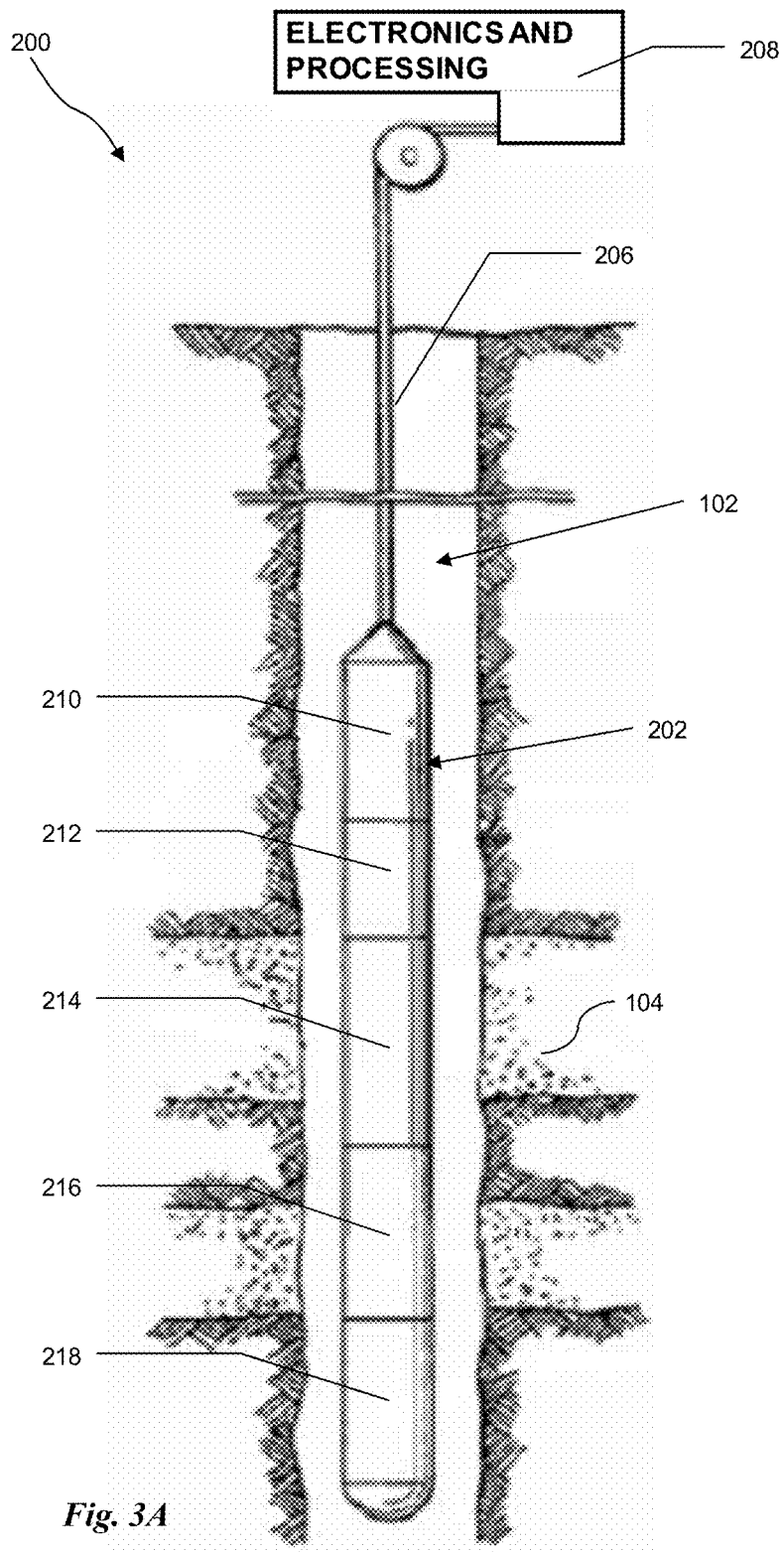
FIG. 3A is a schematic view of apparatus according to one or more aspects of the present disclosure.

FIG. 3A is a schematic view of apparatus according to one or more aspects of the present disclosure, including one embodiment of an environment 200 with a wireline tool 202 in which aspects of the present disclosure may be implemented. The wireline tool 202 may include a gravity sensor 218. The wireline tool 202 is suspended in a borehole 102 from the lower end of a multiconductor cable 206 that is spooled on a winch (not shown) at the Earth's surface. At the surface, the cable 206 is communicatively coupled to an electronics and processing system 208. The wireline tool 202 includes an elongated body 210. Additional sensing modules 212, 214 and 216, e.g., for resistivity, natural gamma radiation and neutron porosity, may also be included in the tool 202. In the illustrated example, the electronics and processing system 208 and/or a downhole control system may be configured to control various components of the tool 202.

Figure 3B:
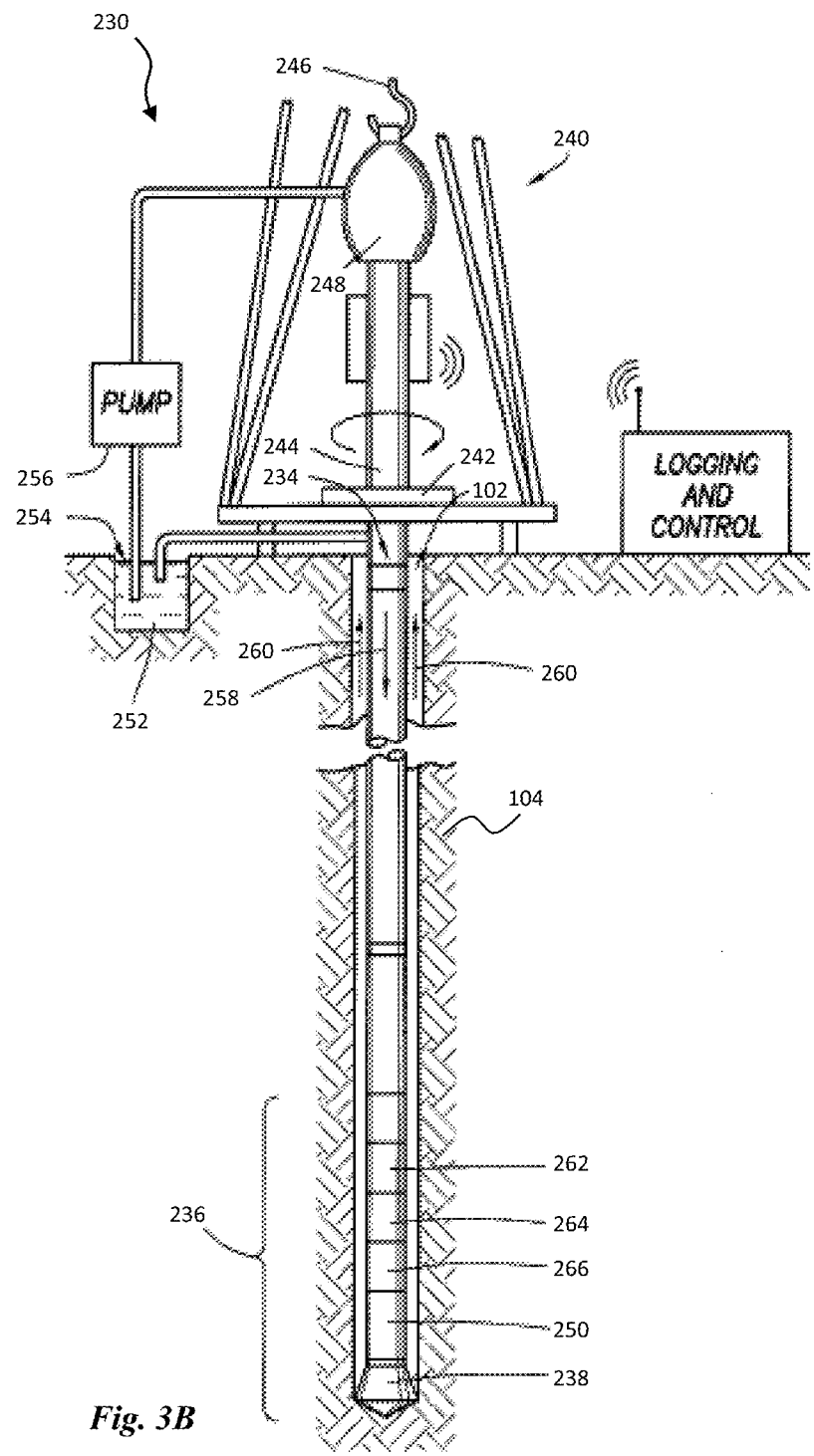
FIG. 3B is a schematic view of apparatus according to one or more aspects of the present disclosure.

FIG. 3B is a schematic view of apparatus according to one or more aspects of the present disclosure, including one embodiment of a wellsite system environment 230 in which aspects of the present disclosure may be implemented. The wellsite can be onshore or offshore. A borehole 102 is formed in subsurface formations (e.g., the formation 104 of FIG. 3B) by rotary drilling and/or directional drilling.

A drill string 234 is suspended within the borehole 102 and has a bottom hole assembly 236 that includes a drill bit 238 at its lower end. The surface system includes platform and derrick assembly 240 positioned over the borehole 102, the assembly 240 including a rotary table 242, kelly 244, hook 246 and rotary swivel 248. The drill string 234 is rotated by the rotary table 242, energized by means not shown, which engages the kelly 244 at the upper end of the drill string. The drill string 234 is suspended from the hook 246, attached to a traveling block (also not shown), through the kelly 244 and the rotary swivel 248, which permits rotation of the drill string relative to the hook. As is well known, a top drive system could alternatively be used.

The surface system further includes drilling fluid or mud 252 stored in a pit 254 formed at the wellsite. A pump 256 delivers the drilling fluid 252 to the interior of the drill string 234 via a port in the swivel 248, causing the drilling fluid to flow downwardly through the drill string 234 as indicated by the directional arrow 258. The drilling fluid 252 exits the drill string 234 via ports in the drill bit 238, and then circulates upwardly through the annulus region between the outside of the drill string and the wall of the borehole 102, as indicated by the directional arrows 260. In this well known manner, the drilling fluid 252 lubricates the drill bit 238 and carries formation cuttings up to the surface as it is returned to the pit 254 for recirculation.

The bottom hole assembly 236 may include a logging-while-drilling (LWD) module 262, a measuring-while-drilling (MWD) module 264, a roto-steerable system and motor 250, and drill bit 238. The LWD module 262 may be housed in a special type of drill collar, as is known in the art, and can contain one or more known types of logging tools. It is also understood that more than one LWD and/or MWD module can be employed, e.g., as represented by LWD tool suite 266.

(References, throughout, to a module at the position of 262 can alternatively mean a module at the position of 266 as well.) The LWD module 262 may include capabilities for measuring, processing, and storing information, as well as for communicating with the surface equipment. In the present embodiment, the LWD module 262 includes measurement devices, such as a gravity sensor.

The MWD module 264 may also be housed in a special type of drill collar, as is known in the art, and can contain one or more devices for measuring characteristics of the drill string 234 and drill bit 238. The MWD module 264 further includes an apparatus (not shown) for generating electrical power to the downhole system. This may typically include a mud turbine generator powered by the flow of the drilling fluid, it being understood that other power and/or battery systems may be employed. The MWD module 264 may include one or more of the following types of measuring devices: a weight-on-bit measuring device, a torque measuring device, a vibration measuring device, a shock measuring device, a stick/slip measuring device, a direction measuring device, and an inclination measuring device. Either of the systems shown in FIG. 3A or FIG. 3B may be used in some examples to obtain measurements from within one or more wellbores for processing as will be further explained below.

An example method according to the invention for 3-D inversion of gravity measurements may be better understood with reference to FIG. 1. The first step in the present method, at 10 is to create a regularized grid model of spatial distribution of a physical property in the wavenumber domain, (e.g., density and/or density contrast) that is similar in configuration to a regular seismic data volume cube. Such regularized grid model may be generated, for example, using software licensed under the trademark PETREL, which is a trademark of Schlumberger Technology Corporation, Sugar Land, Tex. The physical property (e.g., density and/or density contrast) model may be generated using available data such as petrophysical data such as may be obtained from well logs and/or geophysical data such as seismic data. The term "available data" as used in the present context is intended to mean measurements of physical properties related to density of the formations, such as the foregoing described examples.

The second step in the present method, shown at 12 is generating a three-dimensional (3-D) forward model in the wavenumber domain of a physical parameter having a potential field from a model of spatial distribution of the physical property. During this step, a volume (e.g., a cube) with the modeled physical parameter having a potential field will be created. The physical parameter to be forward modeled, which is the order of the derivative of the potential field, can be defined. The initial model of the potential (e.g., gravity) field resulting from step 12 is shown at 26. A particular example of a physical parameter having a potential field is gravity. Other examples may include electrostatic and/or magnetic fields. If wellbores are specified within the modeled volume, then the potential field (e.g., gravity potential field) will be interpolated to include the data from any such wellbore, similar to what is performed with well log data.

Figure 2:
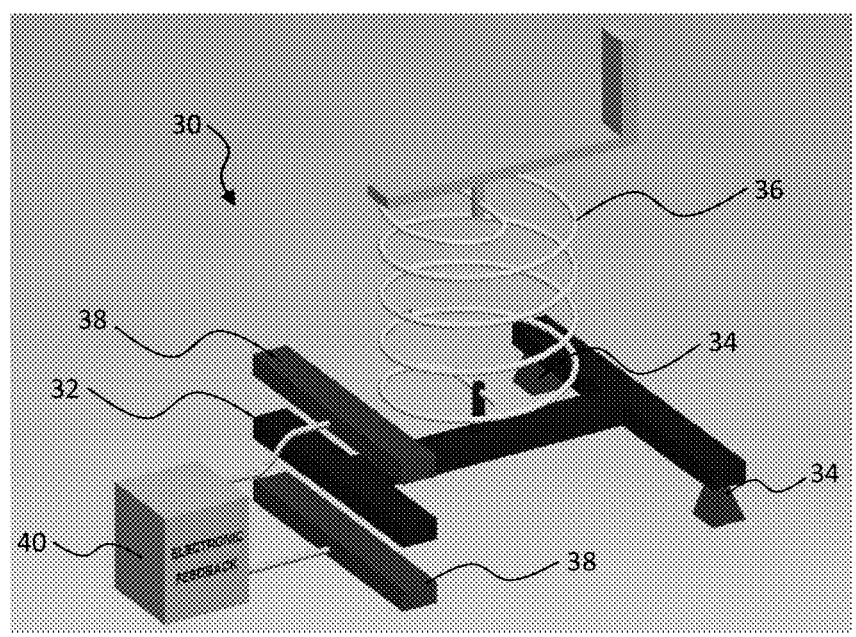
FIG. 2 shows a schematic diagram of a LaCoste and Romberg, spring-type gravimeter.

The third step in the present method, shown at 14 is obtaining measurements of the physical parameter having a potential field (gravity). The measurements may be performed for the first time and/or repeated after a selected time. In a particular example, measurements of the physical parameter having a potential field, e.g., gravity (made, for example, as explained with reference to FIG. 3A or FIG. 3B) may be made in one or more wellbores and/or at one or more surface locations using a sensor such as shown in FIG. 2 (for gravity measurements).

The fourth step in the present method, shown at 16 is generating a revised model 28 of spatial distribution of the potential field (e.g., gravity), by interpolating in the wavenumber domain the measurements of 14 within the volume of the initial potential field model 26.

The fifth step in the present method, shown at 18 is generating a difference between the initial model of spatial distribution of the potential field (e.g., gravity) 26 and the revised model 28. The difference model at 32 may be used to correct or adjust the initial model at 16. The difference model at 32 may also be used as a time-lapse difference of spatial distribution of the potential field.

The sixth step in the present method, shown at 20 is generating by inversion in the wavenumber domain a revised model of spatial distribution of the physical property (e.g., density) 32 from the revised model of spatial distribution of the potential field (e.g., gravity) 28. In addition, the potential field difference model 30 may then be used to generate by inversion in the wavenumber domain a model of spatial distribution of the physical property contrast (e.g., density contrast) 32 as shown at 20.

The third through sixth steps may be repeated sequentially in order to generate a series of time-lapse representations of spatial distribution of the physical property (e.g., density and/or density contrast) 32 and a series of time-lapse representations of spatial distribution of the potential field (e.g., gravity) 28.

In the present invention, forward modeling, interpolation and inversion are performed in the wavenumber domain. Procedures for such forward modeling, interpolation and inversion in the wavenumber domain will be further explained below.

As explained above, measured gravity data may be used in the present method. Gravity data may be obtained, for example, using a gravity sensor similar to the LaCoste and Romberg sensor shown schematically in FIG. 2. Such a sensor may be deployed proximate the Earth's surface at selected locations as part of an instrument sold under model number CG-5 by Scintrex Ltd., 222 Snidercroft Road, Concord, L4K 2K1 Ontario, Canada. The sensor 30 may include a spring 36 suspending a proof mass 32 on pivots 34. Electrodes 38 may be connected to measuring circuits 40 to detect movement of the proof mass 32 as a result of changes in gravitational acceleration.

A gravity sensor may also be deployed in any wellbore as part of an instrument operated under the trademark BOREHOLE GRAVITY TOOL, which is a trademark of Schlumberger Technology Corporation. Examples of deployment in a wellbore are explained above with reference to FIGS. 3A and 3B.

Theory

Having explained various procedures for joint inversion and acquisition of measurements of a physical parameter having a potential field (such as gravity measurements), a technique for forward modeling and inversion of such measurements will now be explained. The explanation which follows is made in terms of gravity, however the general principles are applicable to any physical parameter having a potential field as explained above.

The gravity field g (M) at any position in space (M)=(x, y, z) can be described by Poisson's equation:

$$\frac{\partial^2 g(M)}{\partial x^2} + \frac{\partial^2 g(M)}{\partial y^2} + \frac{\partial^2 g(M)}{\partial z^2} = -\gamma 4\pi \rho(M) \quad 14$$

where $\rho(M)=\rho(x, y, z)$ is the 3-D distribution of density contrast and $\gamma$ is the gravitational constant.

The integral solution of Poisson's equation is:

$$g(x_0, y_0, z_0) = \qquad 15$$
$$\gamma \int\int\int_\infty \rho(x, y, z) \frac{1}{[(x-x_0)^2 + (y-y_0)^2 + (z-z_0)^2]^{1/2}} dx\,dy\,dz$$

where $g(x_0, y_0, z_0)$ is the gravity potential at the point $(x_0, y_0, z_0)$.

The first vertical derivative of the gravity potential is the gravitational acceleration and is:

$$\frac{\partial g}{\partial z} = g_z(x_0, y_0, z_0) = \qquad 16$$
$$\gamma \int\int\int_\infty \rho(x, y, z) \frac{z-z_0}{[(x-x_0)^2 + (y-y_0)^2 + (z-z_0)^2]^{3/2}} dx\,dy\,dz$$

The 3-D Fourier transform for the gravity field defined in equation 14 is:

$$G(\omega_x, \omega_y, \omega_z) = -\gamma 4\pi R(\omega_x, \omega_y, \omega_z) \frac{1}{\omega_x^2 + \omega_y^2 + \omega_z^2} \quad 17$$

where $\omega_x$, $\omega_y$, $\omega_z$ are the wave numbers corresponding to the x, y and z directions, $G(\omega_x, \omega_y, \omega_z)$ is the 3-D spectrum of the gravity potential, and $R(\omega_x, \omega_y, \omega_z)$ is the 3-D spectrum of density.

The 3-D spectrum for the first vertical derivative of the gravity potential, the gravitational acceleration, is:

$$G_z(\omega_x, \omega_y, \omega_z) = \gamma R(\omega_x, \omega_y, \omega_z) \frac{i\omega_z}{\omega_x^2 + \omega_y^2 + \omega_z^2} \quad 18$$

The 3-D spectrum for the second vertical derivative of the gravity potential, the gravity gradient, is:

$$G_{zz}(\omega_x, \omega_y, \omega_z) = \gamma R(\omega_x, \omega_y, \omega_z) \frac{-\omega_z^2}{\omega_x^2 + \omega_y^2 + \omega_z^2} \quad 19$$

A generalized equation for any derivative of the gravity potential is:

$$F_{xyz}\left[\frac{\partial^n \partial^m \partial^k g(v)}{\partial x^n \partial y^m \partial z^k}\right] = \qquad 20$$
$$G_{x^n y^m z^k}(\omega_x, \omega_y, \omega_z) = \gamma R(\omega_x, \omega_y, \omega_z) \frac{(i\omega_x)^n (i\omega_y)^m (i\omega_z)^k}{\omega_x^2 + \omega_y^2 + \omega_z^2}$$

where $F_{xyz}[\ ]$ is the operator for the 3-D Fourier transform, $$\frac{\partial^n \partial^m \partial^k g(v)}{\partial x^n \partial y^m \partial z^k}$$

is the operator for the $n^{th}$ derivative with respect to x, $m^{th}$ derivative with respect to y, and $k^{th}$ derivative with respect to z of the gravity potential at the point $v=(x,y,z)$. FIGS. 4 through 6A and 6B show the 3-D gravity potential and its various derivatives due to a singular or point source.

According to equation 17, forward modeling is a smoothing process applied to the density distribution, and inversion is the reciprocal process to smoothing that introduces higher frequencies. The inversion operation is therefore unstable, so special techniques must be used to obtain reasonable results.

If one obtains the 3-D distribution of a gravity field one can calculate its spectrum. For $g_z$ the spectrum is $G_z(\omega_x, \omega_y, \omega_z)$. The density distribution in this case can be calculated as follows:

$$R(\omega_x, \omega_y, \omega_z) = \frac{1}{\gamma} G_z(\omega_x, \omega_y, \omega_z) \frac{\omega_x^2 + \omega_y^2 + \omega_z^2}{i\omega_z} \quad 21$$

Equation (21) generally cannot be used for practical calculations, because the right term can be infinite so that the reverse Fourier transform does not exist. Stabilization of the inversion can be accomplished through application of the Tikhonov approach (A. N. Tikhonov, Arsenin, V. Y., 1979, *Methods of solving for ill-defined problems*. Moscow, Science, 2nd-edition, 288.) and Wiener inversion (N. Wiener, 1949, *The Extrapolation, Interpolation, and Smoothing of Stationary Time Series with Engineering Applications*, Wiley, New York.). The Wiener deconvolution technique is based on minimizing the mean square error and allows calculations in the wavenumber domain. The Tikhonov approach allows solving for ill-defined problems.

In the present case, the solution may be stabilized by a stabilizer function added to the denominator of Equation (21). This prevents dividing a small value to an even smaller value or to zero in the high frequency range. The Tikhonov approach and Wiener inversion can be combined in the wavenumber domain, in a single equation as follows:

$$R(\omega_x, \omega_y, \omega_z) = \frac{1}{\gamma} \frac{G_z(\omega_x, \omega_y, \omega_z) \frac{-i\omega_z}{\omega_x^2 + \omega_y^2 + \omega_z^2}}{\frac{\omega_z^2}{(\omega_x^2 + \omega_y^2 + \omega_z^2)} + \alpha M(\omega_x, \omega_y, \omega_z)} \quad 22$$

Forward modeling in the wavenumber domain may be more accurate than calculations in the space domain because the former eliminates small distance errors from the point of calculation to the nearest density cell. In the wavenumber domain, all small distance effects will be in the high frequency regime and will be minimized via the Tikhonov approach.

Inversion in the 3-D wavenumber domain corresponds to 3-D deconvolution, which is unstable, but which has a unique solution. All non-uniqueness is addressed during the 3-D gravity field interpolation of new borehole or surface gravity data into the a priori gravity model, which is based on all available density and density related information. Instability of inversion is thus controlled.

Computation Speed

The wavenumber domain method for forward modeling enables very fast computation. For example, the forward model computed from the density distribution of FIG. 13A and displayed in FIGS. 13B and 13C has a regular grid with 182×124×375=8,463,000 cells (derived from a PETREL software pillar grid having 203,112 cells) and required about 1.2 minutes of CPU time, using a Dell® Precision M4500 laptop with 8 GB of RAM, and a single Intel® CORE™ i7 X920 processor with 2.00 GHz speed. The inversion computation for the same reservoir model given in FIGS. 14A through 14D also required about 1.2 minutes of CPU time.

Synthetic Example

Figure 8:
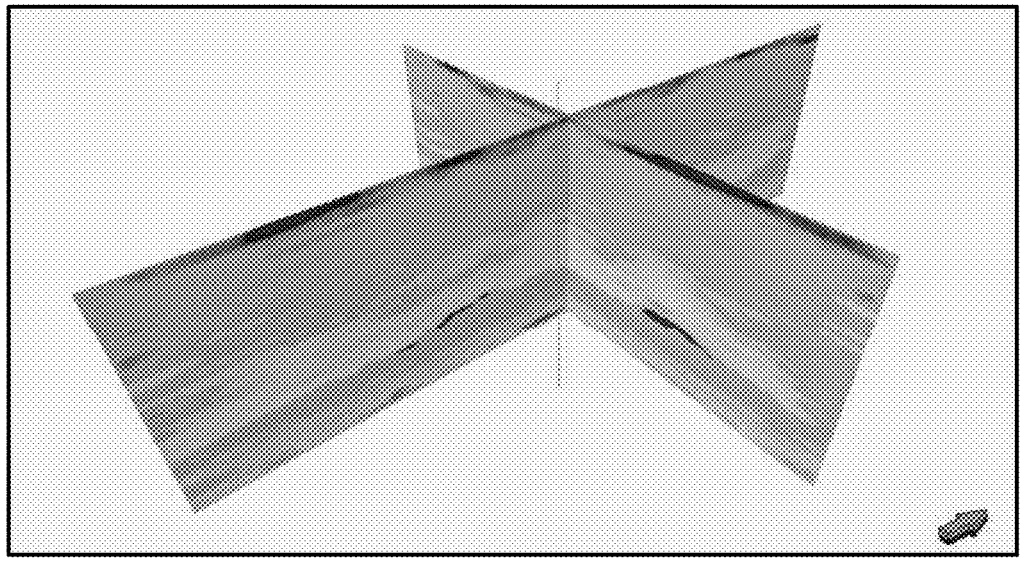
FIG. 8 shows two, orthogonal cross-sections of the density distribution for the model shown in FIG. 7.
Figure 9:
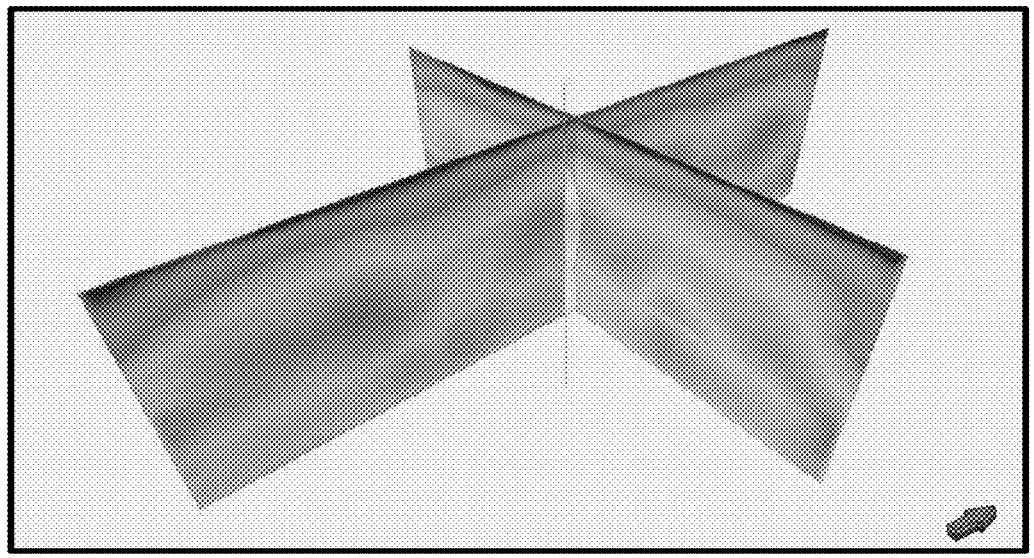
FIG. 9 shows forward modeling of $g_z$ for the density distribution shown in FIGS. 7 and 8. $g_z$ is the gravitational acceleration in the vertical direction. A well log is shown for a specified wellbore disposed near the intersection of the two planes.

A test case has been selected for demonstrating the forward modeling and inversion capabilities of the inversion technique of the invention. The test case is a reservoir model comprising 81×108×61=533,628 cells and each cell having dimensions of 500 m×500 m×50 m. The model was created especially for testing with a data set close to realistic data. The initial model is shown in oblique view in FIG. 7. FIG. 8 shows two orthogonal cross-sections of the density distribution of FIG. 7. FIG. 9 shows results of forward modeling of $g_z$ from the density distribution of FIGS. 7 and 8, where $g_z$ is the gravitational acceleration in the vertical direction. FIG. 10 shows a plan view of the surface at z=0 for the forward modeled $g_z$ of FIG. 9.

Figure 12:
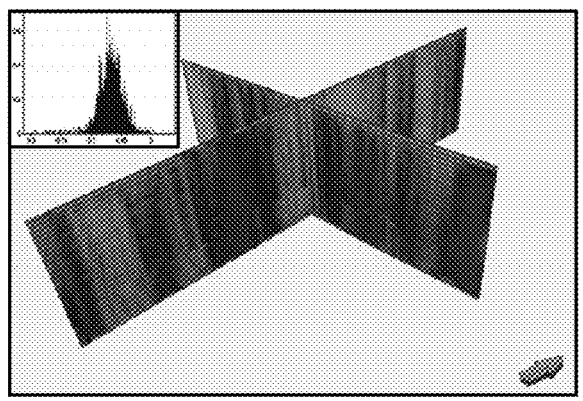
FIG. 12 shows the residual error, that is, the inverted density model minus the initial density model shown in FIGS. 11A and 11B. The inset plot in FIG. 12 is a histogram of the errors.

FIG. 11B shows the result of solving the inverse problem for the density distribution from the gravitational field of FIGS. 9 and 10. The inverted density distribution of FIG. 11B may be compared to the initial density distribution of FIGS. 7 and 8, which is displayed a second time as FIG. 11A. The difference between the initial and inverted density distributions, or the distribution of errors of inversion is shown in FIG. 12. The inset plot in FIG. 12 is a histogram of the errors.

Real Example

Figures 13A, 13B, 13C:
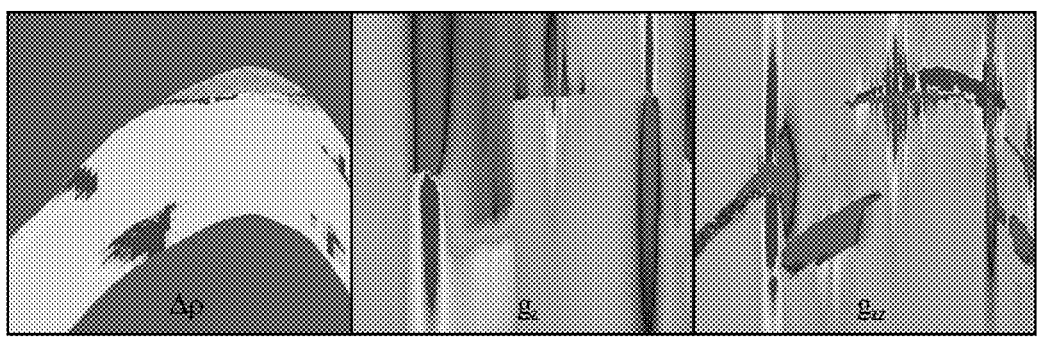
FIGS. 13A, 13B and 13C show, respectively, the density contrast ($\Delta\rho$), the corresponding forward modeled gravity ($g_z$) and gravity gradient ($g_{zz}$) presented in cross-section through a reservoir model.

A real reservoir model has been selected as a second test case for the present forward modeling and inversion method. The example model is the result of a reservoir simulation over multiple years in one year increments. A density model for each year was created in PETREL software from the porosity property, fluid and matrix densities, and from the annual saturations computed in the reservoir simulation. FIG. 13A is a cross-sectional view of the difference in density, or density contrast ($\Delta\rho$) between two consecutive years for this reservoir. The reservoir grid is a pillar grid comprising 91×62×36=203,112 cells.

FIGS. 13A, 13B and 13C show, respectively, the density contrast ($\Delta\rho$), the corresponding forward modeled gravity ($g_z$) and gravity gradient ($g_{zz}$) presented in cross-section through a reservoir model. The results calculated using an example method according to the invention and the distribution of density contrast of FIG. 13A are shown in FIGS. 13B and 13C.

FIGS. 14A and 14B show the result of inverting the 3-D gravity model in order to recover the initial density contrast model. Agreement between initial and inverted models is good. FIGS. 14C and 14D show a similar comparison, through a different cross-section of the reservoir and with a wellbore trajectory superimposed thereon.

SUMMARY

The model calculations according to the present invention demonstrate the use of the proposed method for interpretation of borehole gravity measurements in conjunction with surface gravity measurements. The fast Fourier transform permits applying this method to models with very large dimensions (tens of millions of cells). Sparse borehole gravity data can be interpolated to the entire volume of the subsurface being modeled, while taking into account surface gravity data. The result of this interpolation will determine the solution of the inversion problem, and it is this interpolation step along with the constraints provided by the initial density distribution that ensures a unique solution. A manageable solution to the inverse problem requires well controlled and powerful software such as PETREL software to interpolate the gravitational field from the borehole and surface data over the entire area of investigation.

When using gravity field data for geological interpretation one may use as much a priori information as is available to build the initial density model, such as borehole log data, the results of seismic data inversion, and geological and structural models. By finding a forward modeling solution maximum close to the initial model one can have high confidence that the solution is unique.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining spatial distribution of a physical property within a volume of subsurface rock formations, comprising:

generating in a processing system an initial model of spatial distribution of the physical property of the subsurface rock formations using available data, the data related to the physical property distribution within the volume;

generating in the processing system a forward model in the wavenumber domain of spatial distribution of a potential field;

entering as input to an interpolation performed in the processing system measurements of a physical parameter having a potential field obtained at spaced apart locations above the volume and/or in at least one wellbore penetrating the volume, the measurements obtained from at least one sensor disposed above the volume or having been moved along an interior of a wellbore;

generating in the processing system a revised model of spatial distribution of the potential field by interpolating the measurements above the volume and/or in the at least one wellbore to a plurality of positions within the volume, the interpolating performed in the wavenumber domain; and generating in the processing system a revised model of spatial distribution of the physical property by combining inversion with stabilization of inversion in the wavenumber domain in a single equation of the revised potential field model.

2. The method of claim 1 further comprising constraining the initial model of the spatial distribution of the physical property using any other petrophysical and/or geophysical information related to the volume.

3. The method of claim 1 further comprising eliminating non-uniqueness of the potential field model inversion by performing three-dimensional interpolation of the measurements of the physical parameter having a potential field within the generated forward model of the potential field.

4. The method of claim 1 wherein the inversion comprises Wiener inversion.

5. The method of claim 1 wherein the inversion comprises minimization of small distance errors using the Tikhonov approach in the wavenumber domain for stabilization of the inversion.

6. The method of claim 1 further comprising using the Tikhonov approach and Wiener inversion to reduce inversion instability.

7. The method of claim 1 further comprising entering as input later-acquired measurements of the physical parameter having a potential field from above the volume and/or in at least one wellbore for inverting time-lapse potential field data to construct a model of time-lapse change of the spatial distribution of the physical property within the volume.

8. The method of claim 1 wherein the physical property comprises density.

9. The method of claim 1 wherein the measured physical parameter having a potential field comprises gravity.

10. A method for determining spatial distribution of a physical property within a volume of subsurface rock formations, comprising:
   deploying at least one sensor above the volume and/or at least one sensor in at least one wellbore penetrating the volume;
   obtaining measurements of a physical parameter having a potential field from the at least one deployed sensor;
   generating an initial model of spatial distribution of the physical property using available data, the data related to spatial distribution of the physical property within the volume;
   generating a forward model in the wavenumber domain of spatial distribution of a potential field;
   entering as input to an interpolation measurements of the physical parameter having a potential field from the at least one deployed sensor;
   generating a revised model of spatial distribution of the potential field by interpolating the measurements above the volume and/or in the at least one wellbore to a plurality of positions within the volume, the interpolating performed in the wavenumber domain; and
   generating a revised model of spatial distribution of the physical property by combining inversion with stabilization of inversion in the wavenumber domain in a single equation of the revised potential field model.

11. The method of claim 10 further comprising constraining the initial model of the spatial distribution of the physical property using any other petrophysical and/or geophysical information related to the volume.

12. The method of claim 10 further comprising eliminating non-uniqueness of the potential field model inversion by performing three-dimensional interpolation of the measurements of the physical parameter within the generated forward model of the potential field.

13. The method of claim 10 wherein the inversion comprises Wiener inversion.

14. The method of claim 10 wherein the inversion comprises minimization of small distance errors using the Tikhonov approach in the wavenumber domain for stabilization of the inversion.

15. The method of claim 10 further comprising using the Tikhonov approach and Wiener inversion to reduce inversion instability.

16. The method of claim 10 further comprising entering as input later-acquired measurements of the physical parameter having a potential field from above the volume and/or in at least one wellbore for inverting time-lapse potential field data to construct a model of time-lapse change of the spatial distribution of the physical property within the volume.

17. The method of claim 10 wherein the physical property comprises density.

18. The method of claim 10 wherein the potential field comprises gravity potential field.

19. A method for determining spatial distribution of a physical property within a volume of subsurface rock formations, comprising:
   generating in a processing system an initial model of spatial distribution of the physical property using available data, the data comprising sensor measurements related to the physical property spatial distribution within the volume;
   generating in the processing system a forward model in the wavenumber domain of spatial distribution of a potential field; and
   inverting in the processing system by combining inversion of the forward model with stabilization of inversion in the wavenumber domain in a single equation to generate a model of spatial distribution of the physical property within the volume.

20. The method of claim 19 further comprising entering as input to an interpolation measurements of a physical parameter having a potential field obtained at spaced apart locations above the volume and/or in at least one wellbore penetrating the volume;
   generating a revised model of spatial distribution of the potential field by interpolating the measurements above the volume and/or in the at least one wellbore to a plurality of positions within the volume, the interpolating performed in the wavenumber domain; and
   generating a revised model of spatial distribution of the physical property by inversion in the wavenumber domain of the revised potential field model.

21. The method of claim 19 further comprising constraining the initial model of the spatial distribution of the physical property using any other petrophysical and/or geophysical information related to the volume.

22. The method of claim 19 further comprising eliminating non-uniqueness of potential field model inversion by performing three-dimensional interpolation of potential field data within the generated forward model of potential field.

23. The method of claim 19 wherein the inversion comprises Wiener inversion.

24. The method of claim 19 wherein the inversion comprises minimization of small distance errors using the Tikhonov approach in the wavenumber domain for stabilization of the inversion.

25. The method of claim 19 further comprising using the Tikhonov approach and Wiener inversion to reduce inversion instability.

26. The method of claim 19 further comprising entering as input later-acquired measurements of the physical parameter having a potential field from above the volume and/or in at least one wellbore penetrating the volume for inverting time-lapse potential field data to construct a model of time-lapse change of the spatial distribution of the physical property within the volume.

27. The method of claim 19 wherein the physical property comprises density.

28. The method of claim 19 wherein the potential field comprises gravity potential field.

29. A method for determining spatial distribution of density within a volume of subsurface rock formations, comprising:

generating in a processing system an initial model of spatial distribution of density using available data, the data related to the density distribution within the volume;

generating in the processing system a forward model in the wavenumber domain of spatial distribution of gravity;

entering as input to an interpolation measurements of gravity obtained using a gravity responsive sensor at spaced apart locations above the volume and/or in at least one wellbore penetrating the volume;

generating in the processing system a revised model of spatial distribution of gravity by interpolating the measurements above the volume and/or in the at least one wellbore to a plurality of positions within the volume, the interpolating performed in the wavenumber domain; and generating in the processing system a revised density model by combining inversion with stabilization of inversion in the wavenumber domain in a single equation of the revised gravity model.

30. The method of claim 29 further comprising constraining the initial density model using any other petrophysical and/or geophysical information related to the volume.

31. The method of claim 29 further comprising eliminating non-uniqueness of gravity potential field model inversion by performing three-dimensional interpolation of gravity data within the generated gravity forward model.

32. The method of claim 31 further comprising using a Tikhonov approach and Wiener inversion to reduce inversion instability.

33. The method of claim 29 wherein the inversion comprises Wiener inversion.

34. The method of claim 29 wherein the forward modeling comprises minimization of small distance errors using the Tikhonov approach in the wavenumber domain for stabilization of the inversion.

35. The method of claim 29 further comprising entering as input later-acquired gravity data from above the volume and/or in at least one wellbore penetrating the volume for inverting time-lapse gravity data to construct a model of the time-lapse density change within the volume.

* * * * *